United States Patent [19]

Villers

[11] 3,930,237

[45] Dec. 30, 1975

[54] METHOD FOR AUTOMATING THE PRODUCTION OF ENGINEERING DOCUMENTATION UTILIZING AN INTEGRATED DIGITAL DATA BASE REPRESENTATION OF THE DOCUMENTATION

[75] Inventor: Philippe Villers, Cambridge, Mass.

[73] Assignee: The Computervision Corporation, Bedford, Mass.

[22] Filed: Mar. 7, 1974

[21] Appl. No.: 448,892

[52] U.S. Cl. .............................. 340/172.5; 235/151

[51] Int. Cl.$^2$ .......................................... G06F 15/20

[58] Field of Search .......... 235/61.6 A, 61.6 B, 151; 444/1; 340/172.5

[56] References Cited

UNITED STATES PATENTS 3,529,298 9/1970 Lourie ............................ 340/172.5

FOREIGN PATENTS OR APPLICATIONS 1,801,702 5/1970 Germany ............................ 235/151

1,197,889 7/1970 United Kingdom ................. 235/151

OTHER PUBLICATIONS

"An Experimental Program for Architectural Design" by Newman, Computer Science Section, Imperial College, London.

*Primary Examiner*—Eugene G. Botz

*Attorney, Agent, or Firm*—Richard J. Birch

[57] ABSTRACT

A method for automating the production of engineering documentation having at least one graphical entity thereon. The method utilizes an integrated digital data base representation of the engineering document. A symbolic identifier is placed on the document with respect to each graphical entity. The document is then electro-optically scanned to produce a digital representation of the document. Each symbolic identifier is recognized from the digital representation of the identifier. At least a portion of the digital data within a predetermined area positioned with respect to each symbolic identifier is deleted from the digital representation of the document. A correspondence is generated between each symbolic identifier and a particular entry in a symbol library and then a digital representation of the library symbol is substituted for the previously deleted digital data within the specific predetermined area. The resulting digital representation of the document with the substitution is stored as an integrated, digital data base. Thereafter the integrated digital data base can be used an an input to an automatic plotter to produce a perfectly plotted engineering document.

17 Claims, 18 Drawing Figures

METHOD FOR AUTOMATING THE PRODUCTION OF ENGINEERING DOCUMENTATION UTILIZING AN INTEGRATED DIGITAL DATA BASE REPRESENTATION OF THE DOCUMENTATION

BACKGROUND OF THE INVENTION

The present invention relates to digitizing and pattern recognition methods in general and, more particularly, to a method for producing an integrated digital data base representation of a document containing graphical entities thereon.

The last few years have seen the serious beginnings of wide scale commercial implementation of minicomputer controlled design and drafting automation systems to assist both the designer and the draftsman in preparation and final execution of engineering drawings in a far more cost effective manner than manual techniques could provide. By 1974, the number of such systems in use in industry has already passed the low hundreds. Industry use covers a broad spectrum of industries ranging from the first users in the aerospace and automotive field, to further present use in numerous companies ranging from the electronics industry to designers of nuclear power plants, farm machinery, and elevators.

The purpose of these design automation systems is, in all cases, to reduce the total documentation cost by making the designer or draftsman able to perform the work faster, and or better than can be done by conventional manual techniques. However, a hitherto unsolved problem limits the rate of growth of the field. To gain assistance of the computer, the user is required to manually enter a design concept into the data base. This process known in the art as "digitizing". Much progress has been made using interactive terminals in speeding up the process of entering the sketch into the computer's data base so that the power of the computer can be brought to bear in producing final drawings. Nonetheless, manual entry time represents a major portion of the total time, and thereby limits the savings otherwise available. In many cases, manual entry time is in fact the dominant time element in the creation of the final drawing from an initial sketch.

The problem is particularly acute when, as is commonly the case, an automated design drafting system is required to incorporate into its data base the information contained in hundreds of previously manually created drawings. Those have to be entered one at a time via digitizing techniques. Thus, the problem of initial data entry remains a challenge, and fully automated entry has long since been recognized to be the natural answer.

Various solutions have been proposed to solve the initial data entry problem. Considerable time and effort has been expended on the so-called "computer xerographic" techniques of data entry. However, what is desired is not merely the entry of a photograph like reproduction of the drawing or sketch to be scanned into the computer data base, but instead an intelligent rendition of the drawing or sketch, i.e., one that like its digitized equivalent, maintains geometrical hierarchy, so that it can be further manipulated at a subsequent time. Properly recognized, it can be easily modified, added to, deleted from and the like. It is for this reason that the relatively simple design approach of scanning in with a television camera, storing the data on tape and then outputting on a raster plot, is generally unsatisfactory because the resulting data represents a series of points which may not be analyzed in any systematic manner. The notion of lines, circles, arrowheads, and other symbols just does not exist in this form. In addition, the amount of stored data in the computerized system is formidable.

It is accordingly a general object of the invention to provide an economical method of fully automated data entry of graphical documents into an integrated digital data base for subsequent utilization of the data base as an input to an automatic plotter.

It is a specific object of the present invention to provide an integrated digital data base representation of a document having one or more graphical entities thereon.

It is another object of the invention to provide a method by which perfectly drawn symbols can be substituted in digital form for the digital representation of printed or hand sketched symbols in a digital data base.

It is a feature of the invention that predetermined textual material can be integrated into the digital data base representation of the graphical document with proper association of the textual material with respect to a particular symbol.

It is another feature of the invention that the method thereof can be practiced with existing instrumentation that is well known to the character and pattern recognition art.

BRIEF DESCRIPTION OF THE INVENTION

The invention utilizes a recognition technique in the field of Optical Graphics Recognition ("OGR"). OGR is defined as the recognition by automatic means of graphical entities, either printed or hand-sketched, and entering the location and symbolic representation of the recognized entities into a digital data base according to a predefined set of rules. OGR includes the conventional Optical Character Recognition ("OCG") as a special subset.

Each graphical document which is to be entered into the digital data base is prepared for automatic digitizing by placing a symbolic identifier on the document for each graphical entity thereon. The symbolic identifier is positioned with respect to each graphical entity and normally comprises a symbol "flag" which provides a positional reference and an alphanumeric symbol identifier. The prepared document is then scanned by conventional electro-optical means to provide a digital representation of the document. Each graphical entity symbolic identifier is recognized from the digital representation thereof and at least a portion of the digital data within a predetermined area positioned with respect to each symbolic identifier is deleted from the digital representation of the prepared document. A correspondence is generated between each symbolic identifier and a particular entry in a symbol library. A digital representation of the library symbol corresponding to the particular symbolic identifier is substituted for the deleted digital data within the predetermined area. If desired, a digital representation of textural material is integrated with the digital representation of the document. The resulting digital data representation of the document (with substitution(s) and the textual material) is stored as an integrated digital data base. This data base can then be used to generate a finished document by means of a conventional automated plotter or drafting equipment.

The objects and features of the invention will best be understood from a detailed description of a preferred embodiment thereof, selected for purposes of illustration and shown in the accompanying drawings, in which.

DETAILED DESCRIPTION OF A PREFERRED EMBODIMENT OF THE INVENTION

Figures 1, 2:
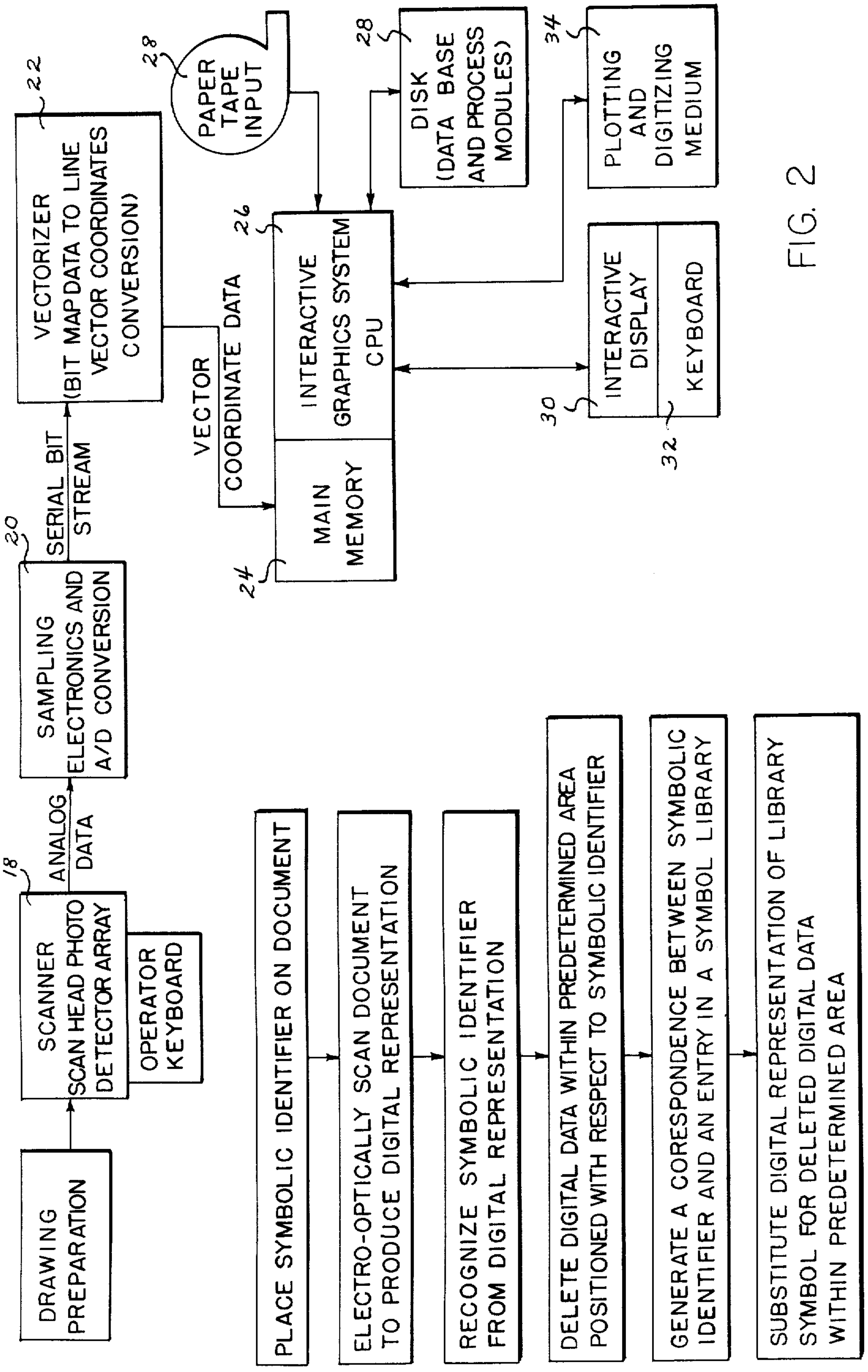
FIG. 1 is a flow block diagram illustrating the steps of the method of the present invention.
FIG. 2 is a partial functional and block diagram of an apparatus for performing the method of the present invention.

Turning now to the drawings, FIG. 1 illustrates in flow block diagram form the steps which are performed in practicing the method of the present invention. The method can be practiced by utilizing conventional hardward components, such as those shown in FIG. 2, and with software derived from the specific set of rules discussed below in connection with FIGS. 3 through 10.

Referring to FIGS. 1 through 3, the initial step in practicing the method of the invention is to prepare a drawing or document 10 which contains at least one graphical entity such as a gate 12, by placing a symbolic identifier, indicated generally by the reference numeral 14, on the document with respect to each graphical entity 12. In the preferred embodiment, each symbolic identifier 14 comprises a symbol "flag" 16 and an alphanumeric symbol identifier 18. The symbolic identifier 14 can be placed either inside or outside of the corresponding graphical entity 12 or at any predetermined place with respect to the particular entity.

After the symbolic identifier(s) have been placed on the document, the document is ready for digitizing by conventional electro-optical scanning means, such as scanner 18, which employs a photo-detector array in the scan head. It will be appreciated that a flying spot-scanner or other known electro-optical scanning means also can be employed to produce the desired scanned electrical representation of the prepared document. The output from scanner 18 is applied to a sampling and A/D conversion circuit 20 which produces a serial bit stream output. The serial bit stream bit map data is converted to line vector coordinates by a vectorizer 22. The vector coordinate data is stored in main memory 24 and processed in CPU 26 in accordance with the pre-defined set of rules.

Each symbolic identifier 14 is recognized from its digital representation. In the preferred embodiment, the symbol flag 16 has a predetermined width which is machine recognizably different from the graphical entities and surrounding areas on document 10. Other symbol flag characteristics, e.g., color differences or black and white contrasts, can be employed to distinguish the flags from the graphical entities and background areas and to recognize each flag encountered during the scanning operation.

Figure 3A:
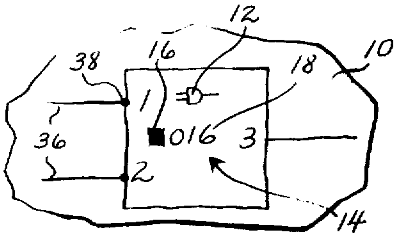
FIGS. 3A and 3B depict the standard figure placement for connected figures on the graphical document and show the hand-drawn input sketch in FIG. 3A and the machine plotted output sketch in FIG. 3B.
Figure 11:
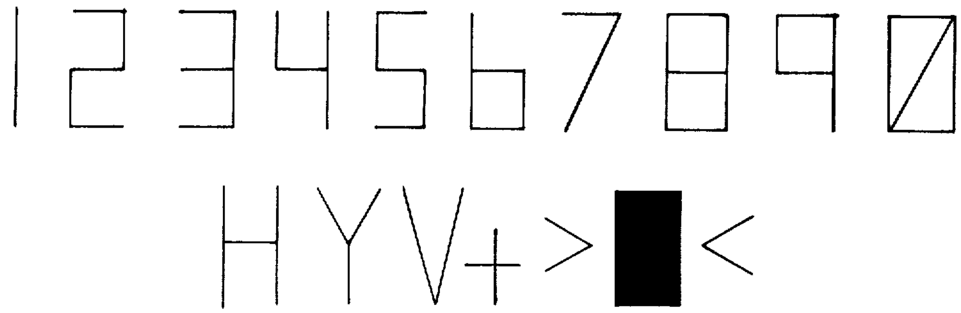

Assuming a left-to-right scan as viewed in FIG. 3A, the encounter of a symbol flag indicates that a corresponding alphanumeric symbol identification 18 will be encountered shortly thereafter. The alphanumeric symbol identification 18 is placed on the drawing for each graphical entity by hand-sketching, stamping, or by means of a decal. A machine recognizable font, such as the one shown in FIG. 11, is used for the symbol identification. This particular font utilizes simple straight line segments which are suitable for vectorial as opposed to raster type data base analysis.

Each symbol identification 18 (or symbolic identifier 14 in the general sense) corresponds to a particular entry in a symbol library contained in the main memory 24. Each entry in the symbol library in turn contains a digital representation of a perfectly drawn symbol, e.g., gate 12 shown in FIG. 3B. This digital representation is substituted for the digital data within a known predetermined area positioned with respect to each symbolic identifier 14. Normally the predetermined area includes the hand-drawn symbol and an "erase area" or "erase window" around the symbol. The resulting digital representation of the document 10 is then stored as an integrated digital data base on disk 28.

In many instances it is desirable to add textural materials to the digital representation of the engineering document. The textual material is prepared and stored in digital form on a paper tape 28 and inputted to the CPU where it is combined with the digital data representation of the document. The various types of textual materials which are stored on paper tape will be discussed below.

In the preferred embodiment of the apparatus for practicing the method of the invention, an interactive display 30 and keyboard entry 32 are provided to permit visual operator modification of the displayed graphical document and the associated textual materials. An automatic plotting and digitizing medium 34 also is provided to produce a hard copy output of the integrated digital data base which is stored on disk 28.

Having described the method steps of my invention in connection with the conventional hardware implementation shown in FIG. 2, I will now discuss in detail the predefined set of rules for processing the scanned digital data representation of the document. Given these rules, any person skilled in the art can write the appropriate software for implementing the rules.

For purposes of illustration, it is assumed that the document 10 is an electrical schematic. However, it should be understood that the method of the invention can be used to produce complex drawings including integrated circuit mask designs, printed circuit art-work, logic diagrams of all forms, layouts of many types including power systems and piping systems, and generalized mechanical drafting.

An understanding of the data input process for electrical schematics can be facilitated by recognizing the logical division of such schematics into three classes of things; namely, "Figures", "Connect Lines" and "Text Nodes" and by defining each of these terms as follows:

FIGURE: A predefined graphics "symbol" including explicit points of connection for lines (called connect nodes) and text entry areas (called text nodes), and if desired an explicit erase area, as defined by the sketched figure outline on the "input" sketch.

FIGURE GROUPS: Figure groups are a reoccurring group of figures that are defined for convenience as a "super" or group figure and can be referred to by a group name.

CONNECT LINE: All connect lines are assumed to begin and end at a figure, (input and output points are considered figures). T-intersections are assumed to be connections that need not be made explicit, and four-way intersections are crossovers, not connections. Connect lines digitize directly into the data base except for possible slope constraint, (to 0°, 90°, 45°) and gridding.

TEXT NODE: A string of alphabetic characters attached to a figure that move with the figure and are deleted if it is. Text can be either defined as part of figure or attached to the figure as variable entries in the form of text nodes. Using these definitions, the rules for processing the input data can be established. The following discussion of the rules relates to FIGS. 3 through 11 of the drawings.

RULES FOR AUTOSCAN ELECTRICAL SCHEMATIC INPUTS

Figure 3B:
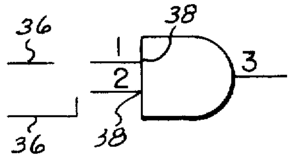

1. When plotting a symbol read from the document 10 in its library symbol representation on the final drawing or document, the apparatus of FIG. 2 will automatically, unless otherwise specified by user, place the resulting symbol so that the plotted symbol is aligned to horizontal and vertical document gridding input lines in the following manner, as shown in FIGS. 3A and 3B.

VERTICAL POSITIONING

If the number of input lines 36 is odd, the alignment is such that the centermost connect node 38 on the left side lines up exactly with the input line. If the number of input lines is even, as shown in FIG. 3A, the symbol lines up with the connect node immediately above the center axis of the symbol. Note that the upper input line 36 is vertically aligned with the symbol connect node marked "1" in the plotted format shown in FIG. 3B. The lower input line 36 may have a possible jog to for a connection with the other symbol connect node.

HORIZONTAL ALIGNMENT

Figure 4A:
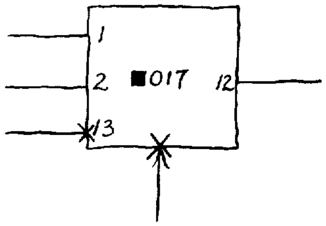
FIGS. 4A and 4B depict a non-standard figure placement for connected figures on the graphical document and show the hand-drawn input sketch in FIG. 4A and the machine plotted output sketch in FIG. 4B.
Figure 4B:
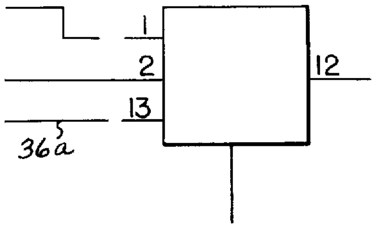

The left edge of the plotted symbol will align with the left edge of the symbol outline. This method produces well aligned and well centered figures in relation to the hand-drawn input sketch. If the user wishes to depart from the above rule, as shown in FIGS. 4A and 4B, he may place an "X" at the point where any connect node, which crosses the figure outline will be perfectly aligned in the finished drawing. Using this technique, with a maximum of two "X's", he can force both a left hand margin, at a desired place, and a bottom margin. Note the exact match in FIG. 4B of the input line 36a and connect node marked "13".

Figure 8A:
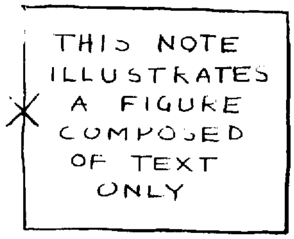
FIGS. 8A and 8B illustrate, respectively, a "text only" figure in the hand-drawn input sketch and the machine drawn output sketch.
Figure 8B:
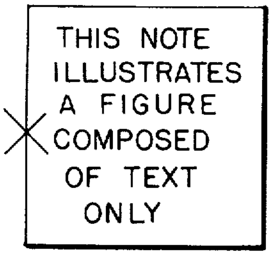

In the case where no connection exists to a figure or symbol, for instance a "figure" composed solely of text then the "X" on the figure outline as shown in FIG. 8A is placed on the center of the left side of figure outline and will result in a figure vertical centered about the "X" to the nearest line grid, and with its left side aligned with the "X".

2. LINE GRID: All connect line lines will be assumed to be located on their nearest 0.1 inch center on a machine invisible background grid on the drawing 10. Other grid meshes can also be user selected including metric, but only one line grid value per drawing is used.

Figure 5A:
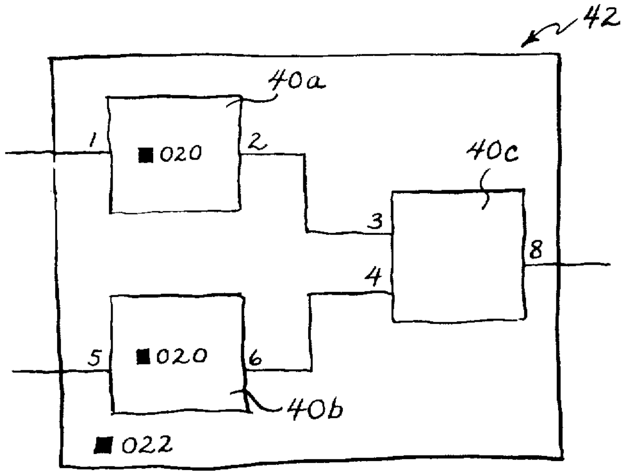
FIGS. 5A and 5B illustrate the generation of group figures with the hand-drawn input sketch shown in FIG. 5A and the machine plotted output sketch shown in FIG. 5B.
Figure 5B:
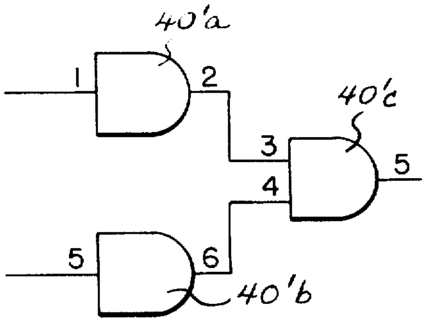
Figure 6A:
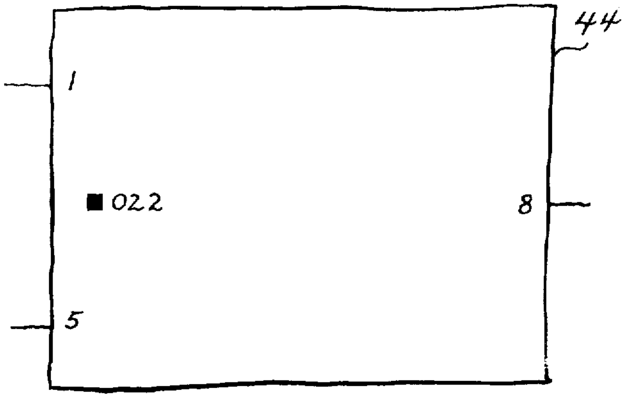
FIGS. 6A and 6B illustrate the use of group figures as defined in FIG. 5A and again show the hand-drawn input and machine plotted output sketches in FIGS. 6A and 6B, respectively.
Figure 6B:
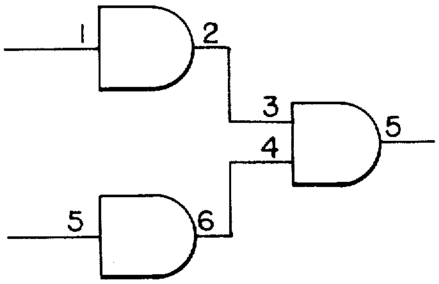

3. CREATION OF FIGURE GROUPS: Recurring groups of FIGS. 40*a*, 40*b* and 40*c* can be drawn as a single group FIG. 42 as shown in FIGS. 5A and 5B in which case at output time the connect nodes will be attached to the individual figures (identified by a prime notation) as if each figure had been drawn and then connected in the standard way. Thus, a large figure outline 44 can be used to stand for a repeated pattern as shown in FIG. 6A provided a sample such as FIG. 5A is shown to the side, to be scanned in as a group figure.

Figure 7A:
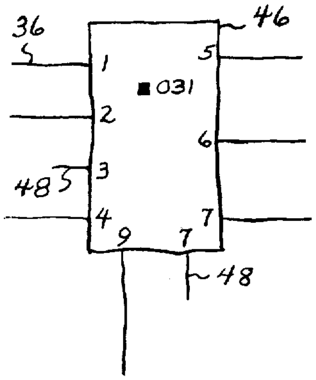
FIGS. 7A and 7B illustrate the use of "connect nodes" in the hand-drawn input sketch of FIG. 7A and in the machine plotted output sketch of FIG. 7B.
Figure 7B:
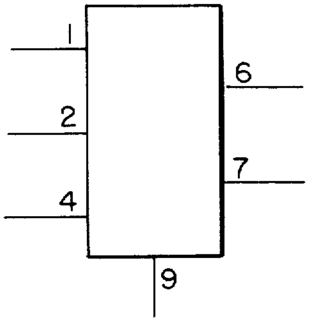

4. CONNECT NODES: In defining a figure or symbol, the number of input lines 36 leading to pins or "connect nodes" 38 up to four sides will be drawn as shown in FIGS. 7A and 7B. The apparatus will automatically connect all the lines brought through or to the figure "walls" 46 on the freehand sketch to the nearest connect nodes. To do this the system counts connect nodes on each side. Therefore, if a connect node is not connected by the user he must shown this omission by having a short unterminated straight line 48 going out from the unused node (length ¼ to ½) as seen in FIG. 7A. The apparatus, in connecting the connect nodes which are used for plotting will skip over one or more unused connect nodes, e.g., node 48.

Figure 9:
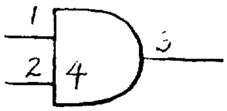
FIG. 9 illustrates the use of "text nodes"

5. TEXT NODES: As shown in FIG. 9, each stored figure will have assigned text nodes 48 for variable inputs including "remote text nodes" associated with it at pre-indicated positions. Not all text nodes need to be used all the time. The user as further described in "9" below will label freehand on his sketch all text nodes he wishes to use. Text nodes, for typing convenience, are numbered in a standard sequence, namely counter-clockwise, starting at the top of the left side. The nodes inside the figure outline are entered last, in top to bottom sequence.

6. FIGURE LIBRARY: The "output" or plotted figure format will be drawn on pre-sized sheets, e.g., 8 ½ × 11, and will be in the exact output form as stored in the symbol library However, when sketching the inputs, the draftsman drawing the symbol freehand can simplify as much as he wishes or even omit drawing the symbol since the symbol identifier will define the library symbol which is substituted in the digital data base. These library symbols are normally manually digitized on the digitizing medium 34.

7. END OF LINE LABELS: Where input lines are connected to a component, they can be labelled as "remoted text nodes" as explained below in item 9.

Figure 10A:
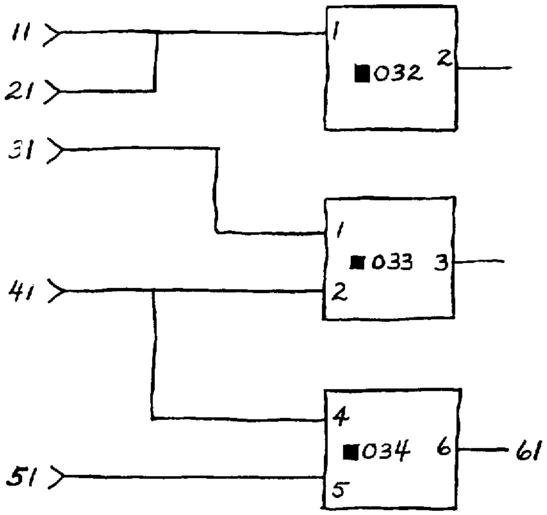
FIGS. 10A and 10B depict the use of "remote test nodes" in the hand-drawn input sketch of FIG. 10A and in the machine plotted output sketch of FIG. 10B, and, FIG. 11 illustrates a font which is suitable for vector analysis and which is used for the symbolic identifier in the graphical document.
Figure 10B:
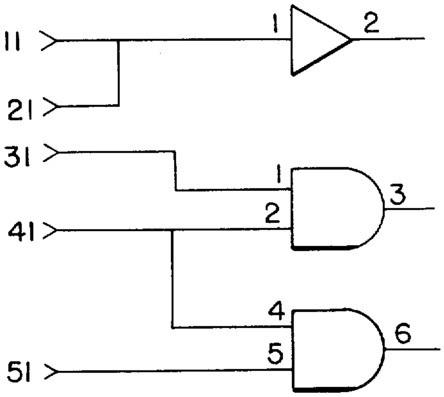

8. REMOTE TEXT NODES: As shown in FIGS. 10A and 10B, contents of these are inserted by the apparatus at the "other end" of lines connected to each connect node. If more than one input or output line links to a connect node, then sequence is read as top-to-bottom. If more than one text node joins the same input line, then any one of the text nodes can be used to create the input line label. Thus, looking at these figures, 51 is the left remote of 034-2 and 61 is the right remote of 034-3 and where 11 and 21 are the left remote text nodes of 032-1, "4" is the left remote of either 032-2 or 034-1.

9. TEXT CONTENT: The draftsman when sketching, can write the intended content of the text nodes anywhere in the "figure outline" (see Item "10" below) of each figure or symbol. It is there only for his use and that of the typist. The apparatus will ignore all such information, inside the "erase window". This information will be read by the typist and entered on paper tape in standard text node sequence. Alternately, text content can be entered for typing directly on an annotation form sheet, or entered on-line after scanning on a regular editing terminal.

10. FIGURE OUTLINE AND ASSOCIATED ERASE WINDOW: In the preferred embodiment, an "erase window" 50 is defined by drawing a substantially closed figure outline or box around the symbol on the sketch. Preferably, the figure is a closed rectangle. The apparatus identifies the box as the first closed line it comes to when looking to the left of the "symbol flag" 16, or left hand digit of the symbol identifier 18 in annotation color, and will follow the line around. Therefore, when sketching, no other line may be placed between the left hand side of the "flag" or numbers and the closest edge of the outline, defining the erase window 50. The figure outline used need not bear any special relationship to the final symbol shape to be plotted at "output time". In the preferred mode, the figure outline is substantially rectangular in shape, while output drawn figures can be as complex as desired. For erasing purposes, the apparatus takes the hand-drawn rectangular figure outline and erases an exactly rectangular area fitted around (i.e., at the extreme X and Y limits of) the freehand drawn approximate rectangle. Alternately, the "erase window" area can be established by coordinates which were previously defined as part of each library symbol's definition.

Having described the data processing rules for an electrical schematic, it will be appreciated by those skilled in the art that comparable sets of rules can be defined for other types of graphical documents including the previously mentioned integrated circuit mask designs, printed circuit artwork and power and piping system layouts. Furthermore, those skilled in the art also will recognize that the corresponding software can be written without requiring any further description given the preceding discussion and the illustrative example of the rules for an electrical schematic.

It should be understood that numerous modifications can be made in practicing the method of my invention without departing from the scope thereof as defined in the following claims.

What I claim and desire to secure by Letters Patent in the United States is:

1. A method for producing an integrated digital data base representing a document having at least one graphical entity thereon, said method comprising the steps of:

1. placing a symbolic identifier on the document with respect to each graphical entity thereon;
2. electro-optically scanning said document top produce a digital representation thereof,
3. recognizing the symbolic identifier from the digital representation thereof;
4. deleting at least a portion of the digital data within a predetermined area positioned with respect to each symbolic identifier;
5. generating a correspondence between each symbolic identifier and a particular entry in a symbol library; and,
6. substituting for the deleted digital data a digital representation of a library symbol corresponding to the particular symbolic identifier within said predetermined area.

2. A method for producing an integrated digital data base representing a document having at least one graphical entity thereon, said method comprising the steps of:

1. placing a symbolic identifier on the document with respect to each graphical entity thereon;
2. electro-optically scanning said document to produce a digital representation thereof,
3. recognizing the symbolic identifier from the digital representation thereof,
4. deleting at least a portion of the digital data within a predetermined area positioned with respect to each symbolic identifier;
5. generating a correspondence between each symbolic identifier and a particular entry in a symbol library;
6. substituting for the deleted digital data a digital representation of a library symbol corresponding to the particular symbolic identifier within said predetermined area; and,
7. storing the digital representation of said document with said substitution as an integrated data base.

3. A method for producing an integrated digital data base representing a document having at least one graphical entity thereon, said method comprising the steps of:

1. placing a symbolic identifier on the document with respect to each graphical entity thereon;
2. electro-optically scanning said document to produce a digital representation thereof,
3. recognizing the symbolic identifier from the digital representation thereof;
4. deleting at least a portion of the digital data within a predetermined area positioned with respect to each symbolic identifier;
5. generating a correspondence between each symbolic identifier and a particular entry in a symbol library; and,
6. substituting for the deleted digital data a digital representation of a library symbol corresponding but not visually related to the particular symbolic identifier within said predetermined area.

4. The method of claim 3 wherein said symbol identifier comprises a machine recognizable symbol flag and a machine recognizable symbol identification alphanumeric.

5. The method of claim 4 wherein said substituted library symbol is positioned with respect to said symbol flag.

6. A method for producing an integrated digital data base representing a document having at least one graphical entity thereon, said method comprising the steps of:

1. placing a symbolic identifier on the document with respect to each graphical entity thereon;
2. electro-optically scanning said document to produce a digital representation thereof,
3. recognizing the symbolic identifier from the digital representation thereof;
4. deleting at least a portion of the digital data within a predetermined area positioned with respect to each symbolic identifier;
5. generating a correspondence between each symbolic identifier and a particular entry in a symbolic library;
6. substituting for the deleted digital data a digital representation of a library symbol corresponding but not visually related to the particular symbolic identifier with said predetermined area; and,
7. storing the digital representation of said document with said substitution as an integrated data base.

7. A method for producing an integrated digital data base representing a document having at least one graphical entity thereon, said method comprising the steps of:

1. placing a symbolic identifier on the document at a predetermined position with respect to each graphical entity thereon;
2. drawing a substantially closed figure around each symbolic identifier, said substantially closed figure defining a data erase window;
3. electro-optically scanning said document to produce a digitized representation thereof;
4. recognizing the symbolic identifier and the existence of the substantially closed figure;
5. deleting at least a portion of the digital data within the data erase window;
6. generating a correspondence between each symbolic identifier and a particular entry in a symbol library; and,
7. substituting for the deleted digital data a digital representation of a library symbol corresponding but not visually related to the particular symbolic identifier within said data erase window.

8. The method of claim 7 wherein said symbol identifier comprises a machine recognizable symbol flag and a machine recognizable symbol identification alphanumeric.

9. The method of claim 8 wherein said substituted library symbol is positioned with respect to said symbol flag.

10. A method for producing a digital data base representing a document having a plurality of graphical symbols interconnected by a plurality of line segments, said method comprising the steps of:

1. placing a symbolic identifier on the document at a predetermined position with respect to each graphical symbol thereon;
2. drawing a substantially closed figure around each symbolic identifier, said closed figure defining a data erase window with at least one of said interconnecting line segments contacting the exterior portion of the perimeter of the closed figure;
3. electro-optically scanning said document to produce a digitized representation thereof;
4. recognizing the symbolic identifier and the existence of the data erase window; and, 5. deleting at least a portion of the digital data within the data erase window;
6. generating a correspondence between each symbolic identifier and a particular entry in a symbol library; and,
7. substituting for the erased digital data a digital representation of a symbol from a symbol library which corresponds to the particular symbolic identifier within the data erase window, said substituted symbol being positioned with respect to said at least one line segment.

11. A method for producing an integrated digital data base representing a document having a plurality of graphical symbols interconnected by a plurality of line segments, said method comprising the steps of:

1. placing a symbolic identifier on the document at a predetermined position with respect to each graphical symbol thereon;
2. drawing a substantially closed figure around each symbolic identifier, said substantially closed figure defining a data erase window with at least one of said interconnecting line segments contacting the exterior portion of the perimeter of the substantially closed figure;
3. electro-optically scanning said document to produce a digitized representation thereof;
4. recognizing the symbolic identifier and the existence of the substantially closed figure;
5. deleting at least a portion of the digital data within the data erase window;
6. generating a correspondence between each symbolic identifier and a particular entry in a symbol library;
7. substituting for the deleted digital data a digital representation of a symbol from the symbol library which corresponds but is not visually related to the particular symbolic identifier within the data erase window, said substituted symbol being positioned with respect to said at least one line segment; and,
8. storing the digital representation of said document with said substitution as an integrated data base.

12. The method of claim 11 wherein said substantially closed figure is substantially rectangular.

13. The method of claim 11 wherein said symbol identifier comprises a machine recognizable symbol flag and a machine recognizable symbol identification alphanumeric.

14. The method of claim 14 wherein said substituted library symbol is positioned with respect to said symbol flag.

15. A method for automating the production of engineering documents utilizing an integrated digital data base representing an engineering document having at least one graphical entity thereon, said method comprising the steps of:

1. placing a symbolic identifier on the document with respect to each graphical entity thereon;
2. electro-optically scanning said document to produce a digital representation thereof.
3. recognizing the symbolic identifier from the digital representation thereof,
4. deleting at least a portion of the digital data within a predetermined area positioned with respect to each symbolic identifier;
5. generating a correspondence between each symbolic identifier and a particular entry in a symbol library;

6. substituting for the deleted digital data a digital representation of a library symbol corresponding to the particular symbolic identifier with said predetermined area;
7. storing the digital representation of said document with said substitution as an integrated data base; and,
8. utilizing the stored, integrated data base as an input to an automatic plotter to produce an engineering document.

16. The method of claim 15 further comprising the steps of integrating a digital representation of textural material with the digital representation of the document.

17. A method for producing an integrated digital data base representing a document having at least one graphical entity thereon, said method comprising the steps of:

1. placing a symbolic identifier on the document at a predetermined position with respect to each graphical entity thereon;
2. placing a plurality of delineations on the document at predetermined positions with respect to each symbolic identifier, said delineations defining a data erase window;
3. electro-optically scanning said document to produce a digitized representation thereof;
4. recognizing the symbolic identifier and the existence of the data erase window;
5. deleting at least a portion of the digital data within the data erase window;
6. generating a correspondence between each symbol identifier and a particular entry in the symbol library; and,
7. substituting for the deleted digital data a digital representation of a library symbol corresponding but not visually related to the particular symbolic identifier within said data erase window.

* * * * *